US008461873B2

(12) United States Patent
Ishii et al.

(10) Patent No.: US 8,461,873 B2
(45) Date of Patent: Jun. 11, 2013

(54) RESONANT CLOCK AND INTERCONNECT ARCHITECTURE FOR DIGITAL DEVICES WITH MULTIPLE CLOCK NETWORKS

(75) Inventors: Alexander T. Ishii, Princeton, NJ (US); Marios C. Papaefthymiou, Ann Arbor, MI (US)

(73) Assignee: Cyclos Semiconductor, Inc., Berkeley, CA (US)

( * ) Notice: Subject to any disclaimer, the term of this patent is extended or adjusted under 35 U.S.C. 154(b) by 0 days.

(21) Appl. No.: 13/103,985

(22) Filed: May 9, 2011

(65) Prior Publication Data
US 2011/0210761 A1 Sep. 1, 2011

Related U.S. Application Data

(63) Continuation of application No. 12/125,009, filed on May 21, 2008, now Pat. No. 7,973,565.

(60) Provisional application No. 60/931,582, filed on May 23, 2007.

(51) Int. Cl.
*H03K 19/096* (2006.01)

(52) U.S. Cl.
USPC .......................................................... 326/93

(58) Field of Classification Search
None
See application file for complete search history.

(56) References Cited

U.S. PATENT DOCUMENTS

| 4,611,135 A | 9/1986 | Nakayama et al. |
| 5,023,480 A | 6/1991 | Gieseke et al. |
| 5,036,217 A | 7/1991 | Rollins et al. |
| 5,111,072 A | 5/1992 | Seidel |
| 5,122,679 A | 6/1992 | Ishii et al. |
| 5,146,109 A | 9/1992 | Martignoni et al. |
| 5,311,071 A | 5/1994 | Ueda |
| 5,332,916 A | 7/1994 | Hirai |
| 5,384,493 A | 1/1995 | Furuki |
| 5,396,527 A | 3/1995 | Schlecht et al. |
| 5,410,491 A | 4/1995 | Minami |
| 5,430,408 A | 7/1995 | Ovens et al. |

(Continued)

FOREIGN PATENT DOCUMENTS

| EP | 0953892 | 11/1999 |
| EP | 1126612 | 8/2001 |

(Continued)

OTHER PUBLICATIONS

Athas et al., "Low-Power Digital Systems Based on Adiabatic-Switching Principles," IEEE Transactions on Very Large Scale Integration (VLSI) Systems, vol. 2, No. 4, pp. 398-407, Dec. 1994.

(Continued)

*Primary Examiner* — Crystal L Hammond
(74) *Attorney, Agent, or Firm* — Sheppard, Mullin, Richter & Hampton LLP

(57) ABSTRACT

A clock and data distribution network is proposed that distributes clock and data signals without buffers, thus achieving very low jitter, skew, loose timing requirements, and energy consumption. Such network uses resonant drivers and is generally applicable to architectures for programmable logic devices (PLDs) such as field programmable gate arrays (FPGAs), as well as other semiconductor devices with multiple clock networks operating at various clock frequencies, and high-performance and low-power clocking requirements such as microprocessors, applications specific integrated circuits (ASICs), and Systems-on-a-Chip (SOCs).

26 Claims, 12 Drawing Sheets

U.S. PATENT DOCUMENTS

| | | | |
|---|---|---|---|
| 5,473,526 A | 12/1995 | Svensson et al. | |
| 5,489,866 A | 2/1996 | Diba | |
| 5,504,441 A | 4/1996 | Sigal | |
| 5,506,520 A | 4/1996 | Frank et al. | |
| 5,506,528 A | 4/1996 | Cao et al. | |
| 5,508,639 A | 4/1996 | Fattaruso | |
| 5,517,145 A | 5/1996 | Frank | |
| 5,517,399 A | 5/1996 | Yamauchi et al. | |
| 5,526,319 A | 6/1996 | Dennard et al. | |
| 5,537,067 A | 7/1996 | Carvajal et al. | |
| 5,559,463 A | 9/1996 | Denker et al. | |
| 5,559,478 A | 9/1996 | Athas et al. | |
| 5,587,676 A | 12/1996 | Chowdhury | |
| 5,675,263 A | 10/1997 | Gabara | |
| 5,701,093 A | 12/1997 | Suzuki | |
| 5,734,285 A | 3/1998 | Harvey | |
| 5,760,620 A | 6/1998 | Doluca | |
| 5,838,203 A | 11/1998 | Stamoulis et al. | |
| 5,841,299 A | 11/1998 | De | |
| 5,872,489 A | 2/1999 | Chang et al. | |
| 5,892,387 A | 4/1999 | Shigehara et al. | |
| 5,896,054 A | 4/1999 | Gonzalez | |
| 5,970,074 A | 10/1999 | Ehiro | |
| 5,986,476 A | 11/1999 | De | |
| 5,999,025 A | 12/1999 | New | |
| 6,009,021 A | 12/1999 | Kioi | |
| 6,009,531 A | 12/1999 | Selvidge et al. | |
| 6,011,441 A | 1/2000 | Ghoshal | |
| 6,037,816 A | 3/2000 | Yamauchi | |
| 6,052,019 A | 4/2000 | Kwong | |
| 6,069,495 A | 5/2000 | Ciccone et al. | |
| 6,091,629 A | 7/2000 | Osada et al. | |
| 6,150,865 A | 11/2000 | Fluxman et al. | |
| 6,160,422 A | 12/2000 | Huang | |
| 6,169,443 B1 | 1/2001 | Shigehara et al. | |
| 6,177,819 B1 | 1/2001 | Nguyen | |
| 6,230,300 B1 | 5/2001 | Takano | |
| 6,242,951 B1 | 6/2001 | Nakata et al. | |
| 6,278,308 B1 | 8/2001 | Partovi et al. | |
| 6,323,701 B1 | 11/2001 | Gradinariu et al. | |
| RE37,552 E | 2/2002 | Svensson et al. | |
| 6,433,586 B2 | 8/2002 | Ooishi | |
| 6,438,422 B1 | 8/2002 | Schu et al. | |
| 6,477,658 B1 | 11/2002 | Pang | |
| 6,538,346 B2 | 3/2003 | Pidutti et al. | |
| 6,542,002 B2 | 4/2003 | Jang et al. | |
| 6,559,681 B1 | 5/2003 | Wu et al. | |
| 6,563,362 B2 | 5/2003 | Lambert | |
| 6,608,512 B2 | 8/2003 | Ta et al. | |
| 6,720,815 B2 | 4/2004 | Mizuno | |
| 6,742,132 B2 | 5/2004 | Ziesler et al. | |
| 6,777,992 B2 | 8/2004 | Ziesler et al. | |
| 6,856,171 B1 | 2/2005 | Zhang | |
| 6,879,190 B2 | 4/2005 | Kim et al. | |
| 6,882,182 B1 | 4/2005 | Conn et al. | |
| 7,005,893 B1 | 2/2006 | Athas et al. | |
| 7,145,408 B2 * | 12/2006 | Shepard et al. | 331/117 D |
| 7,215,188 B2 | 5/2007 | Ramaraju et al. | |
| 7,227,425 B2 | 6/2007 | Jang et al. | |
| 7,233,186 B2 | 6/2007 | Ishimi | |
| 7,301,385 B2 | 11/2007 | Takano et al. | |
| 7,307,486 B2 | 12/2007 | Pernia et al. | |
| 7,355,454 B2 | 4/2008 | Papaefthymiou et al. | |
| 7,622,997 B2 | 11/2009 | Amato et al. | |
| 7,719,316 B2 | 5/2010 | Chueh et al. | |
| 7,719,317 B2 | 5/2010 | Chueh et al. | |
| 7,956,664 B2 | 6/2011 | Chueh et al. | |
| 7,973,565 B2 | 7/2011 | Ishii et al. | |
| 2001/0013795 A1 | 8/2001 | Nojiri | |
| 2002/0140487 A1 | 10/2002 | Fayneh et al. | |
| 2003/0189451 A1 | 10/2003 | Ziesler et al. | |
| 2005/0057286 A1 | 3/2005 | Shepard et al. | |
| 2005/0114820 A1 | 5/2005 | Restle | |
| 2006/0082387 A1 | 4/2006 | Papaefthymiou et al. | |
| 2006/0152293 A1 | 7/2006 | McCorquodale et al. | |
| 2007/0096957 A1 | 5/2007 | Papaefthymiou et al. | |
| 2007/0168786 A1 * | 7/2007 | Drake et al. | 714/724 |
| 2007/0216462 A1 | 9/2007 | Ishimi | |
| 2008/0136479 A1 | 6/2008 | You et al. | |
| 2008/0150605 A1 | 6/2008 | Chueh et al. | |
| 2008/0150606 A1 | 6/2008 | Kumata | |
| 2008/0164921 A1 | 7/2008 | Shin | |
| 2008/0303576 A1 | 12/2008 | Chueh et al. | |
| 2009/0027085 A1 | 1/2009 | Ishii et al. | |
| 2011/0084736 A1 | 4/2011 | Papaefthymiou et al. | |
| 2011/0084772 A1 | 4/2011 | Papaefthymiou et al. | |
| 2011/0084773 A1 | 4/2011 | Papaefthymiou et al. | |
| 2011/0084774 A1 | 4/2011 | Papaefthymiou et al. | |
| 2011/0084775 A1 | 4/2011 | Papaefthymiou et al. | |
| 2011/0090018 A1 | 4/2011 | Papaefthymiou et al. | |
| 2011/0090019 A1 | 4/2011 | Papaefthymiou et al. | |
| 2011/0109361 A1 | 5/2011 | Nishio | |
| 2011/0140753 A1 | 6/2011 | Papaefthymiou et al. | |
| 2011/0210761 A1 | 9/2011 | Ishii et al. | |
| 2011/0215854 A1 | 9/2011 | Chueh et al. | |

FOREIGN PATENT DOCUMENTS

| | | |
|---|---|---|
| EP | 1764669 | 3/2007 |
| JP | 63246865 | 10/1988 |
| JP | 7321640 A | 12/1995 |
| JP | 3756285 | 1/2006 |
| WO | 2005092042 | 10/2005 |

OTHER PUBLICATIONS

Chan et al., "1.1 to 1.6GHz Distributed Differential Oscillator Global Clock Network," International Solid-State Circuits Conference, pp. 518-519, Feb. 9, 2005.

Chan et al., "A 4.6GHz Resonant Global Clock Distribution Network," IEEE International Solid-State Circuits Conference, Feb. 18, 2004.

Chan et al., "A Resonant Global Clock Distribution for the Cell Broadband Engine Processor," IEEE Journal of Solid State Circuits, vol. 44, No. 1, pp. 64-72, Jan. 2009.

Chan et al., "Design of Resonant Global Clock Distributions," Proceedings of the 21st International Conference on Computer Design, pp. 248-253, Oct. 2003.

Chueh et al., "900MHz to 1.2GHz Two-Phase Resonant Clock Network with Programmable Driver and Loading," IEEE Custom Integrated Circuits Conference, pp. 777-780, Sep. 2006.

Chueh et al., "Two-Phase Resonant Clock Distribution," Proceedings of the IEEE Computer Society Annual Symposium on VLSI: New Frontiers on VLSI Design, May 2005.

Cooke et al., "Energy Recovery Clocking Scheme and Flip-Flops for Ultra Low-Energy Application," International Symposium on Low-Power Electronic Design, pp. 54-59, Aug. 25-27, 2003.

Drake et al., "Resonant Clocking Using Distributed Parasitic Capacitance," IEEE Journal of Solid-State Circuits, vol. 39, No. 9, pp. 1520-1528, Sep. 2004.

Dunning, Jim, "An All-Digital Phase-Locked Loop with 50-Cycle Lock Time Suitable for High-Performance Microprocessors," IEEE Journal of Solid-State Circuits, vol. 30, No. 4, pp. 412-422, Apr. 1995.

Fang et al., "A High-Performance Asynchronous FPGA: Test Results," Proceedings of the 13th Annual IEEE Symposium on Field-Programmable Custom Computing Machines, Apr. 2005.

Favalli et al., "Testing Scheme for IC's Clocks," IEEE European Design and Test Conference, Mar. 1997.

Gutnik et al., "Active GHz Clock Network Using Distributed PLLs," IEEE Journal of Solid-State Circuits, vol. 35, No. 11, pp. 1553-1560, Nov. 2000.

Ishii et al., "A Resonant-Clock 200MHz ARM926EJ-S(TM) Microcontroller," European Solid-State Circuits Conference, Sep. 2009.

Kim et al., "Energy Recovering Static Memory," Proceedings of the 2002 International Symposium on Low Power Electronics and Design, pp. 92-97, Aug. 12-14, 2002.

Maksimovic et al., "Design and Experimental Verification of a CMOS Adiabatic Logic with Single-Phase Power-Clock Supply," Proceedings of the 40th Midwest Symposium on Circuits and Systems, pp. 417-420, Aug. 1997.

Maksimovic et al., "Integrated Power Clock Generators for Low Energy Logic," IEEE Annual Power Electronics Specialists Conference, vol. 1, pp. 61-67, Jun. 18-22, 1995.

Moon et al., "An Efficient Charge Recovery Logic Circuit," IEEE Journal of Solid-State Circuits, vol. 31, No. 4, pp. 514-522, Apr. 1996.

Sathe et al., "A 0.8-1.2GHz Frequency Tunable Single-Phase Resonant-Clocked FIR Filter with Level-Sensitive Latches," IEEE 2007 Custom Integrated Circuits Conference, pp. 583-586, Sep. 2007.

Sathe et al., "A 1.1GHz Charge-Recovery Logic," IEEE International Solid-State Circuits Conference, Feb. 7, 2006.

Sathe et al., "A 1GHz Filter with Distributed Resonant Clock Generator," IEEE Symposium on VLSI Circuits, pp. 44-45, Jun. 2007.

Sathe et al., "Resonant-Clock Latch-Based Design," IEEE Journal of Solid-State Circuits, vol. 43, No. 4, pp. 864-873, Apr. 2008.

Teifel et al., "Highly Pipelined Asynchronous FPGAs," Proceedings of the 2004 ACM/SIGDA 12th International Symposium on Field Programmable Gate Arrays, pp. 133-142, Feb. 22-24, 2004.

Weste et al., "Principles of CMOS VLSI Design: A Systems Perspective," 2nd Edition, Addison-Wesley, pp. 9-11, 1992.

Ziesler et al., "A 225 MHz Resonant Clocked ASIC Chip," Proceedings of the 2003 International Symposium on Low Power Electronics and Design, pp. 48-53, Aug. 25-27, 2003.

Ziesler et al., "A Resonant Clock Generator for Single-Phase Adiabatic Systems," Proceedings of the 2001 International Symposium on Low Power Electronics and Design, pp. 159-164, Aug. 6-7, 2001.

Ziesler et al., "Energy Recovering ASIC Design," Proceedings of the IEEE Computer Society Annual Symposium on VLSI, Feb. 20-21, 2003.

Search Report and Written Opinion from International Serial No. PCT/US2007/086304 mailed Mar. 3, 2009.

Search Report and Written Opinion from International Serial No. PCT/US2008/064766 mailed Dec. 22, 2008.

Search Report and Written Opinion from International Serial No. PCT/US2010/052390 mailed Jun. 23, 2011.

Search Report and Written Opinion from International Serial No. PCT/US2010/052393 mailed Jun. 23, 2011.

Search Report and Written Opinion from International Serial No. PCT/US2010/052395 mailed Jun. 23, 2011.

Search Report and Written Opinion from International Serial No. PCT/US2010/052396 mailed Jun. 23, 2011.

Search Report and Written Opinion from International Serial No. PCT/US2010/052397 mailed Jun. 23, 2011.

Search Report and Written Opinion from International Serial No. PCT/US2010/052401 mailed Jun. 29, 2011.

Search Report and Written Opinion from International Serial No. PCT/US2010/052402 mailed Jun. 23, 2011.

Search Report and Written Opinion from International Serial No. PCT/US2010/052405 mailed Jun. 23, 2011.

Search Report from International Serial No. PCT/US2003/010320 mailed Sep. 29, 2003.

Supplementary European Search Report from European Serial No. 03716979.4 mailed Jun. 7, 2006.

Taskin, Baris et al., "Timing-Driven Physical Design for VLSI Circuits Using Resonant Rotary Clocking," 49th IEEE International Midwest Symposium on Circuits and Systems, pp. 261-265, Aug. 6, 2006.

* cited by examiner

RESONANT CLOCK AND INTERCONNECT ARCHITECTURE FOR DIGITAL DEVICES WITH MULTIPLE CLOCK NETWORKS

RELATED APPLICATIONS

This application claims priority to U.S. Nonprovisional patent application Ser. No. 12/125,009 filed May 21, 2008, and entitled "Resonant Clock and Interconnect Architecture for Digital Devices with Multiple Clock Networks" by Alexander T. Ishii, et al., which claims priority to U.S. Provisional Patent Application No. 60/931,582 filed May 23, 2007, and entitled "Resonant Clock and Interconnect Architecture for Programmable Logic Devices," by Alexander Ishii, et al., both of which are hereby incorporated herein by reference.

This disclosure is related to the technologies described in U.S. Pat. No. 6,879,190 ("Low-power driver with energy recovery"), U.S. Pat. No. 6,777,992 ("Low-power CMOS flip-flop"), U.S. Pat. No. 6,742,132 ("Method and apparatus for generating a clock signal having a driven oscillator circuit formed with energy storage characteristics of a memory storage device"), U.S. Patent Application No. 20070096957 ("Ramped clock digital storage control), U.S. Pat. No. 7,355,454 ("Energy recovery boost logic"), U.S. patent application Ser. No. 11/949,664 ("Clock distribution network architecture for resonant-clocked systems"), U.S. patent application Ser. No. 11/949,669 ("Clock distribution network architecture with resonant clock gating"), and the U.S. patent application Ser. No. 11/949,673 ("Clock distribution network architecture with clock skew management"), the entire disclosures of which are hereby incorporated by reference.

FIELD OF THE DISCLOSURE

This disclosure relates generally to clock and data distribution network architectures for programmable logic devices (PLDs) such as field programmable gate arrays (FPGAs). It also relates generally to clock distribution network architectures for digital devices with multiple clock networks and various clock frequencies such as microprocessors, application-specific integrated circuits (ASICs), and System-on-a-Chip (SOC) devices.

BACKGROUND

Resonant drivers have recently been proposed for the energy-efficient distribution of signals in synchronous digital systems. For example, in the context of clock distribution networks, energy efficient operation with resonant drivers is achieved using an inductor to resonate the parasitic capacitance of the clock distribution network. Clock distribution with extremely low jitter is achieved through the elimination of buffers. Moreover, extremely low skew is achieved among the distributed clock signals through the design of relatively symmetric distribution networks. Network performance depends on operating speed and overall network inductance, resistance, size, and topology, with lower-resistance symmetric networks resulting in lower jitter, skew, and energy consumption when designed with adequate inductance.

The distribution of clock and data signals presents a particular challenge in the context of FPGAs, resulting in limited operating speeds and high energy dissipation. Typically, FPGAs deploy multiple clock networks, operating at various clock frequencies. To ensure a high degree of programmability, FPGAs typically provide the means for connecting any storage device (flip-flop) in the FPGA to any of these multiple clock networks. Moreover, all clock networks must be distributed across the entire FPGA. The resulting clock distribution networks are thus highly complex, resulting in relatively lower operating speeds. To exacerbate the situation, the large size and high complexity of these clock networks require the extensive deployment of sophisticated power management techniques such as clock gating, so that overall power consumption is kept at acceptable levels. These power management techniques result in additional design complexity, increased uncertainty in signal timing, and therefore additional limitations to operating speeds.

To maximize programming flexibility, FPGAs typically include one or more large-scale networks for distributing data across the entire device. These networks comprise multiple programmable switches to provide for selective connectivity among the logic blocks in the FPGA. They also include multiple and long interconnects that typically rely on multiple buffers (repeaters) to propagate data. The high complexity of these networks results in increased timing uncertainty in signal timing, limiting operating speeds. The extensive deployment of buffers results in increased energy dissipation. To exacerbate the situation, these networks are often pipelined to provide for higher data transfer rates, resulting in even higher complexity and energy dissipation.

In addition to FPGA devices, multiple clock networks operating at various clock frequencies are generally deployed in microprocessor, ASIC, and SOC designs to implement complex computations and achieve high performance. These clock networks are distributed across the entire device and make extensive use of power management techniques such as clock gating to keep power consumption at acceptable levels. They are therefore highly complex, and their maximum achievable performance is limited by increased timing uncertainty.

One disclosure of design methods for resonant clock networks can be found in U.S. Pat. No. 5,734,285 ("Electronic circuit utilizing resonance technique to drive clock inputs of function circuitry for saving power"). A single resonant domain is described along with methods for synthesizing harmonic clock waveforms that include the fundamental clock frequency and a small number of higher-order harmonics. It also describes clock generators that are driven at a reference frequency, forcing the entire resonant clock network to operate at that frequency. However, the methods do not address clock network architectures or scaling issues that encompass the requirements of FPGA devices. Moreover, it is not concerned with devices that include multiple clock networks operating at various clock frequencies.

Another disclosure of design methods for resonant clock networks can be found in U.S. Pat. No. 6,882,182 ("Tunable clock distribution system for reducing power dissipation"). A method is described for using inductance and capacitance to tune the frequency of a clock distribution network in a programmable logic device. This method focuses on frequency tuning and does not address any clock scaling issues that encompass the requirements of large FPGA devices. Moreover, it does not disclose any clock network architectures for FPGAs.

Resonant clock network designs for local clocking (i.e., for driving flip-flops or latches) are described and empirically evaluated in the following articles: "A 225 MHz Resonant Clocked ASIC Chip," by Ziesler C., et al., International Symposium on Low-Power Electronic Design, August 2003; "Energy Recovery Clocking Scheme and Flip-Flops for Ultra Low-Energy Applications," by Cooke, M., et al., International Symposium on Low-Power Electronic Design, August 2003; "Resonant Clocking Using Distributed Parasitic Capacitance," by Drake, A., et al., Journal of Solid-State Circuits, Vol. 39, No. 9, September 2004, and "Resonant-Clock Latch-Based Design" by Sathe, V., et al., Journal of Solid-State Circuits, Vol. 43, No. 4, April 2008. The designs set forth in these papers are directed to a single resonant domain, however, and do not describe the design of large-scale chip-wide resonant clock network architectures for FPGAs or other devices with multiple clock networks and various clock frequencies.

The design and evaluation of resonant clocking for high-frequency global clock networks was addressed in "Design of Resonant Global Clock Distributions," by Chan, S., et al., International Conference on Computer Design, October 2003, "A 4.6 GHz Resonant Global Clock Distribution Network," by Chan, S., et al., International Solid-State Circuits Conference, February 2004, and "1.1 to 1.6 GHz Distributed Differential Oscillator Global Clock Network," by Chan, S., et al., International Solid-State Circuits Conference, February 2005. These articles focus on global clocking, however, and do not provide any methods for designing a large-scale resonant network that distributes clock signals with high energy efficiency all the way to the individual flip-flops in an FPGA device. Moreover, they are not directed to FPGAs or other devices with multiple clock networks and various clock frequencies.

Another approach for addressing the speed limitations of current FPGA devices is the use of asynchronous logic design. In this approach, clocks are eliminated from the device, and computations are coordinated through the deployment of handshake circuitry. A design for asynchronous FPGAs is described in "Highly Pipelined Asynchronous FPGAs" by Teifel, J., et al., ACM FPGA Conference, 2004. The design and evaluation of a small-scale asynchronous FPGA prototype is described in "A High Performance Asynchronous FPGA: Test Results" by Fang, D., et al., IEEE Symposium on Field Programmable Custom Computing Machines, 2005. A significant drawback of asynchronous FPGAs is the challenge of verifying that the design meets performance requirements under worst-case conditions. FPGA tools are not tailored to perform worst-case timing analysis of a logic structure having multiple clocks. For complex asynchronous structures, checking the worst-case timing of each clock and datapath to verify that worst-case timing constraints are met is an extremely tedious or next to impossible task. Other drawbacks of asynchronous FPGAs include the difficulty in interfacing with conventional synchronous designs and the difficulty in ensuring during testing that they meet worst-case performance requirements under all operating conditions (temperature, supply voltage etc.). With regard to energy consumption, asynchronous circuitry still dissipates the $CV^2$ energy that is required to charge and discharge a capacitive load. It therefore dissipates more energy than resonant drivers when used to drive a signal over capacitive interconnect across an FPGA device.

SUMMARY

A clock and data distribution network is proposed that uses resonant drivers to distribute clock and data signals without buffers, thus achieving low jitter, skew, and energy consumption, and relaxed timing requirements. Such a network is generally applicable to architectures for programmable logic devices (PLDs) such as field programmable gate arrays (FPGAs), as well as other semiconductor devices with multiple clock networks and various clock frequencies, and high-performance and low-power clocking requirements such as microprocessors, ASICs, and SOCs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION OF EMBODIMENTS

Figure 1:
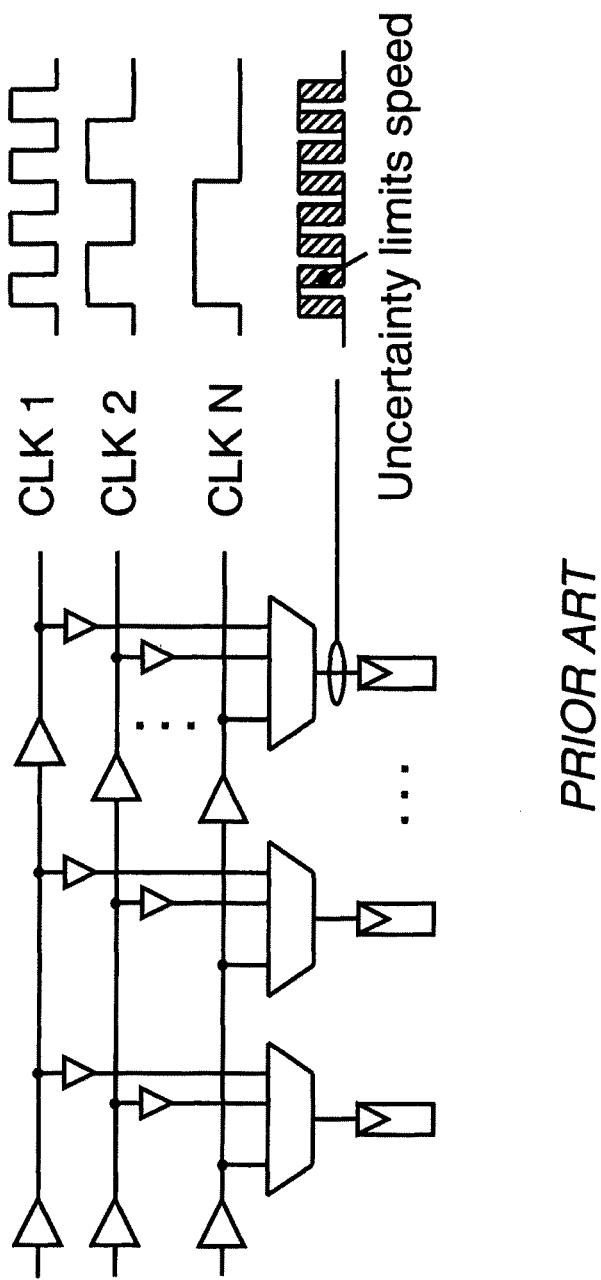
FIG. 1 (Prior Art) shows a typical clock network architecture for FPGAs.

FIG. 1 shows a typical clock network architecture for FPGAs. Multiple clocks $CLK_1$, $CLK_2$, ..., $CLK_N$ are distributed across the entire device using buffered distribution networks. Multiplexers are used to enable the selective association of each flip-flop in the device with each of the multiple clocks. These multiplexers introduce uncertainty in the timing of the clock signals and limit overall operating speed. Moreover, the deployment of clock gating structures (not shown in figure) and buffers introduces additional timing uncertainties and further degrades performance.

Figure 2:
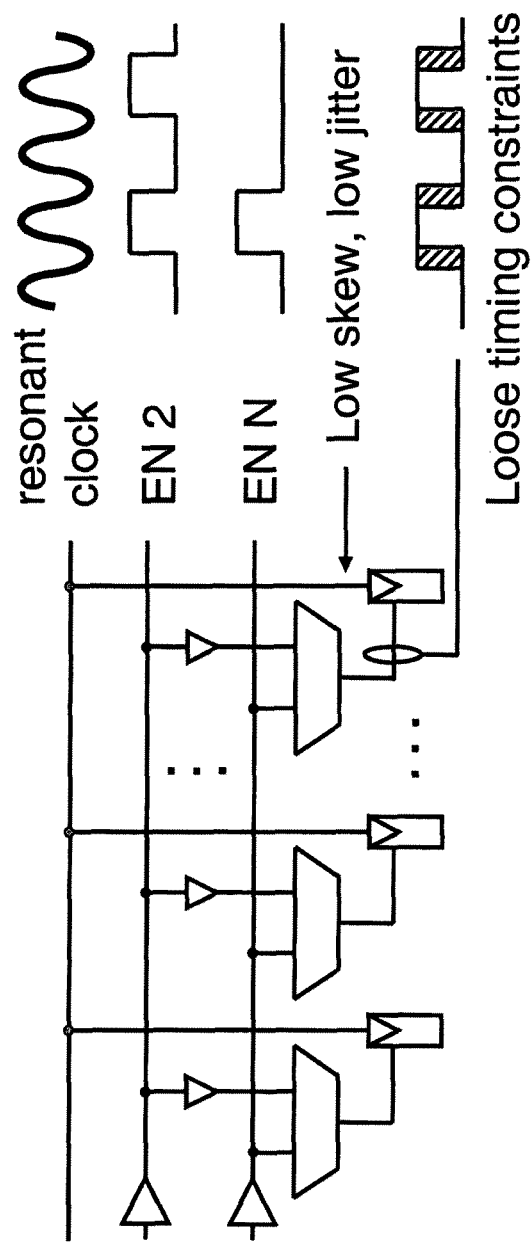
FIG. 2 shows a high-level view of the resonant clock network architecture for FPGAs in accordance with one aspect of the disclosure.

FIG. 2 shows a high-level view of the resonant clock network architecture for FPGAs in accordance with one aspect of the disclosure. In this architecture, a resonant clock distribution network is used to provide a high-speed clock signal of frequency f with very low jitter and skew to all flip-flops in the design. (In an alternative implementation, multiple resonant clock distribution networks may be used, each running at a different frequency.) To allow for clocking at frequencies lower than f, multiple enable signals $EN_2$, ..., $EN_N$ are used that selectively enable their corresponding flip-flops. These enable signals are distributed using buffered distribution networks. Each signal $EN_i$ is asserted with a frequency $f/j_i$, where $j_i$ is an integer, and therefore, the flip-flops enabled by signal $EN_i$ are clocked at a frequency $f/j_i$.

Beyond FPGAs, the disclosed resonant clock architecture is applicable to other semiconductor devices with high-performance and low-power clocking requirements such as microprocessors, ASICs, and SOCs. In these devices, the disclosed resonant clock architecture with its multiple enable signals $EN_2, \ldots, EN_N$ provides a higher-performance, lower-power, and lower-complexity alternative to clock gating.

The timing requirements of the signals $EN_2, \ldots, EN_N$ are significantly less stringent that those of the conventional clock signals $CLK_2, \ldots, CLK_N$. Therefore, the resonant clock network architecture shown in FIG. 2 has a significantly higher tolerance to timing uncertainties in these signals and, thus, achieves higher overall performance than the conventional clocking approach shown in FIG. 1. Furthermore, the energy consumption of the resonant clock network architecture shown in FIG. 2 is lower than that of the conventional approach described in FIG. 1. Specifically, although the resonant clock is distributed to all flip-flops in the device, its intrinsic energy efficiency is significantly higher than that of its conventional counterpart. (For example, when clocking the same capacitive load, the resonant clock consumes less than 25% of the energy dissipated by its conventional counterpart at operating frequencies exceeding 1 GHz.) Moreover, the distribution networks for the enable signals $EN_2, \ldots, EN_N$ have less capacitance and less stringent timing requirements than their conventional counterparts for the clock signals $CLK_2, \ldots, CLK_N$ in FIG. 1, thus resulting in lower energy dissipation.

Another factor that contributes to the high performance of the disclosed resonant clock network architecture is its high energy efficiency. Specifically, due to its intrinsically higher energy efficiency, the resonant clock network architecture enables the deeper pipelining of data paths and data interconnect. In conventional clock networks, the introduction of additional clocked pipeline stages (e.g., flip-flops) raises energy dissipation to prohibitively high levels.

Figure 3:
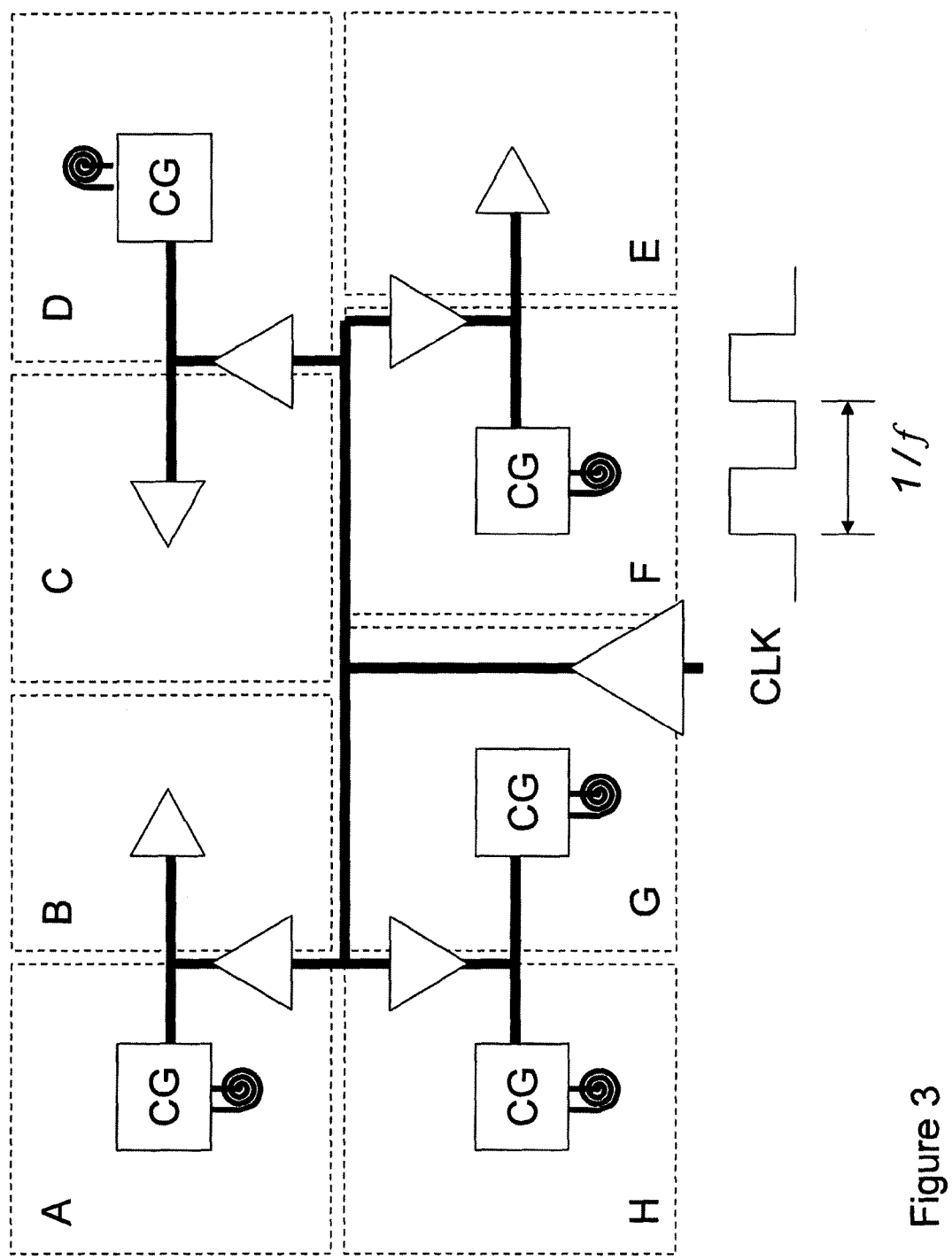
FIG. 3 shows an example of a resonant clock network with multiple resonant clock domains for the entire FPGA device in accordance with one aspect of the disclosure.

FIG. 3 shows an example of a network for distributing the resonant clock from FIG. 2 across an entire FPGA device. In this preferred embodiment, the network has multiple clock domains A, B, . . . , H. A global synchronization signal of frequency f is distributed to these multiple clock domains. This synchronization signal may be distributed using a conventional buffered network, as shown in FIG. 3. Alternatively, it can be distributed using a resonant clock network. All clock domains are synchronized, operating at frequency f. Within each conventional clock domain (B, C, E), the clock signal is distributed using a buffered distribution network. Within each resonant clock domain (A, D, F, G, H), the clock signal is distributed using a buffer-less distribution network. For energy efficiency purposes, each resonant clock domain is using its own inductor and resonant clock driver CG. The inductors can be implemented on-chip using standard bulk silicon processes. Alternatively, the inductors can be implemented off-chip in the package of the device. Here, the enable signals $EN_2, \ldots, EN_N$ can be distributed by a buffered network (not shown) following similar topologies of the clock network.

Figure 4:
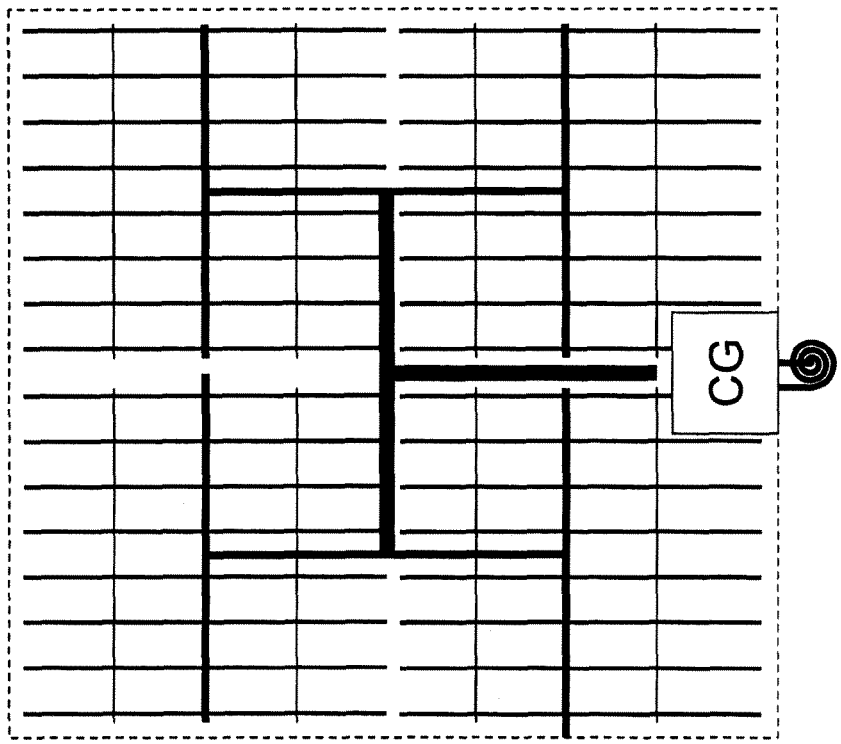
FIG. 4 shows an example of a clock distribution network for each resonant clock domain in accordance with an aspect of the disclosure.
Figure 5:
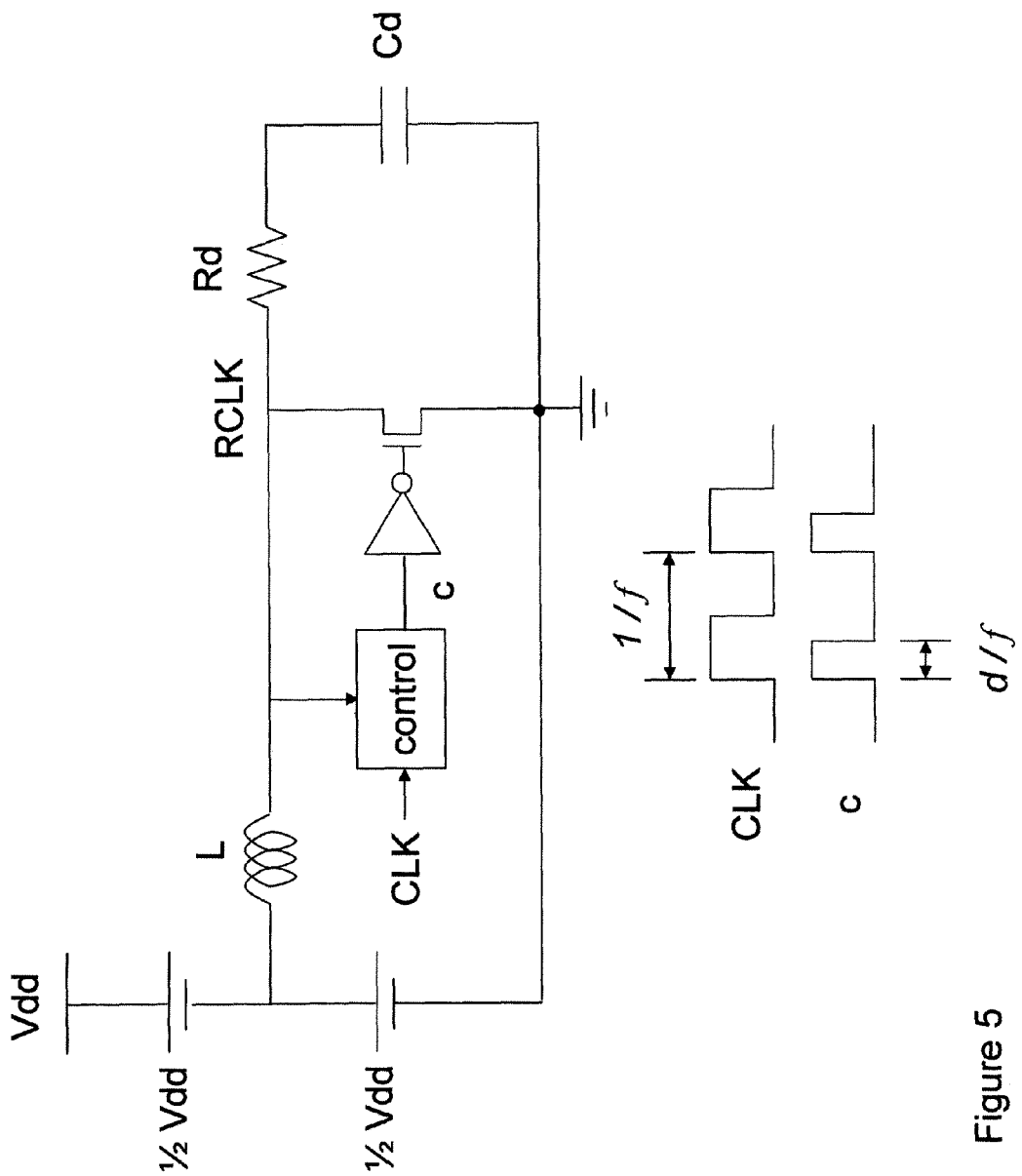
FIG. 5 illustrates one embodiment of a simple clock generator that can be used to generate a resonant clock waveform of essentially sinusoidal shape and of the same frequency f as a reference clock signal.
Figure 6:
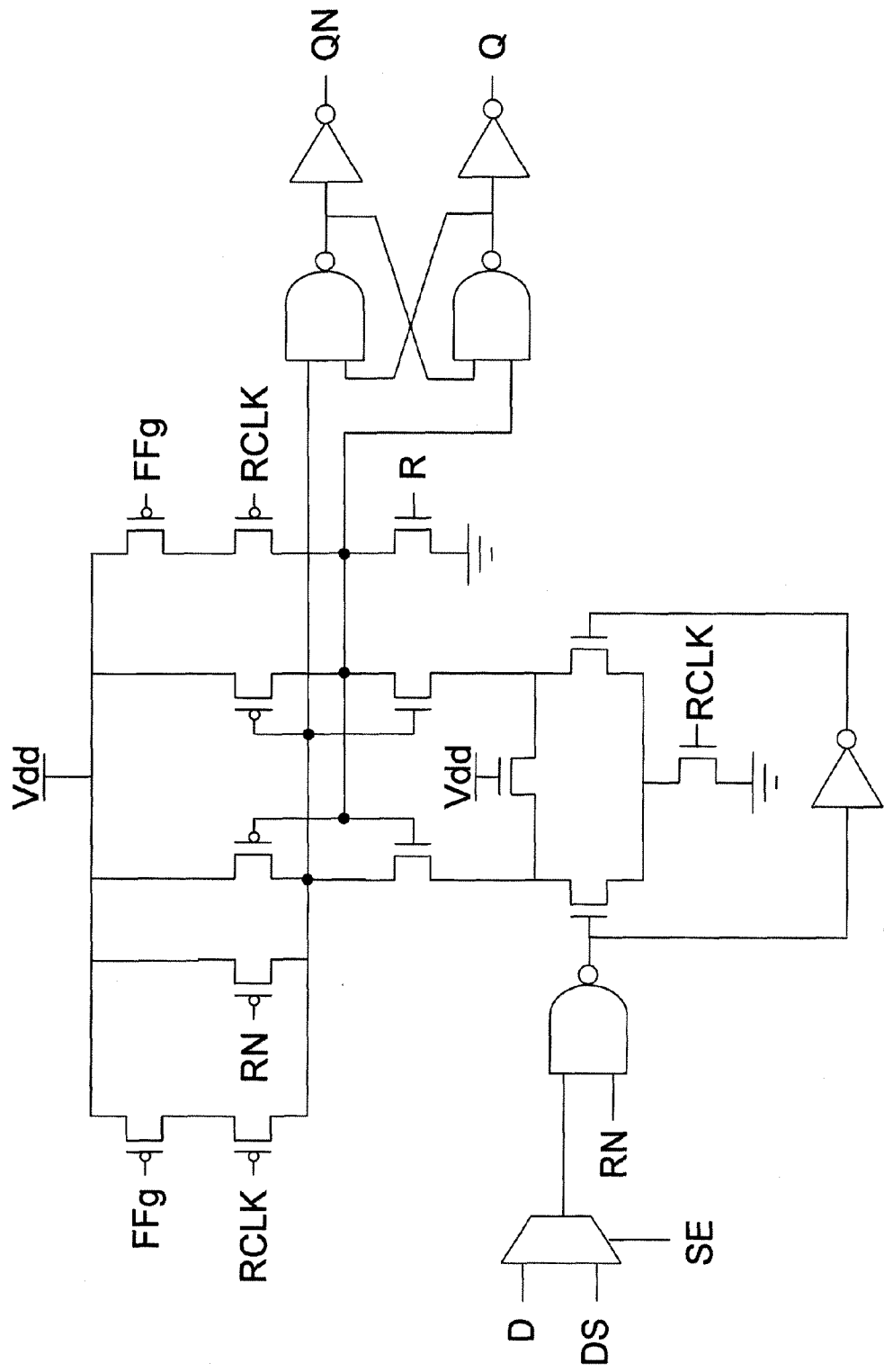
FIG. 6 illustrates an example of a flip-flop with gate enable that can be used with an essentially sinusoidal resonant clock waveform within a resonant clock domain and in conjunction with a signal for disabling the flip-flop.

An example of a buffer-less clock distribution network for each resonant clock domain from FIG. 3 is shown in FIG. 4 in accordance with an aspect of the disclosure. FIG. 5 illustrates one embodiment of a simple clock generator that can be used to generate a resonant clock waveform RCLK of essentially sinusoidal shape and of the same frequency f as a reference clock signal CLK. FIG. 6 illustrates an example of a flip-flop with gate enable that can be used with an essentially sinusoidal resonant clock waveform RCLK within a resonant clock domain and in conjunction with a signal FFg for disabling the flip-flop. This flip-flop provides support for reset through the devices driven by the signals R and its complement RN. It also provides support for scan of data DS through the signal SE. Numerous alternative implementations of this flip-flop with gate enable are possible. For example, an NMOS device driven by FFNg (the inverse of FFg) can be inserted between the NMOS footer clocked by RCLK and ground, replacing the two PMOS devices driven by FFg. Here, FFg can be a complementary signal of the enable signal EN.

Figure 7:
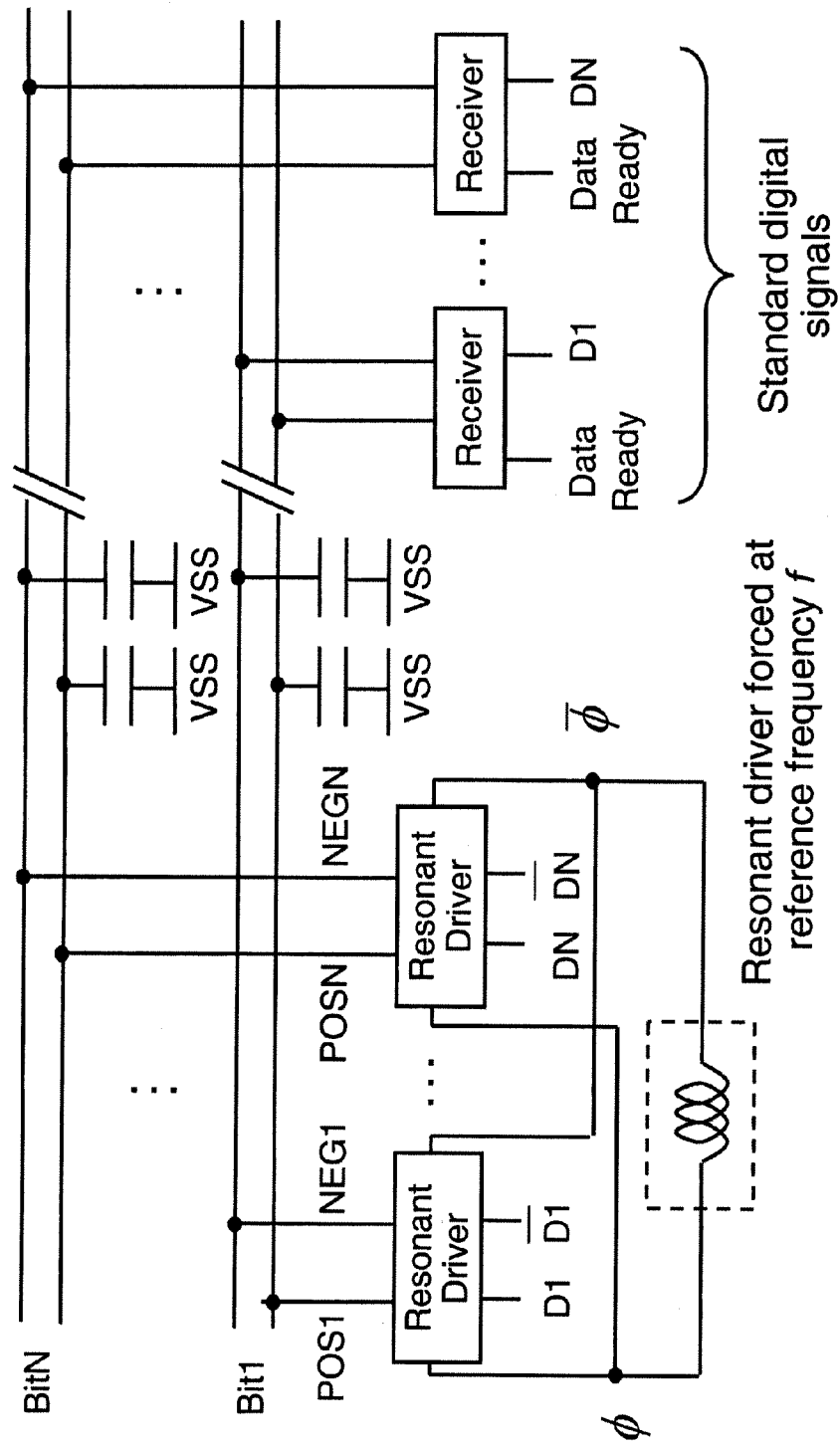
FIG. 7 illustrates a high-level view of the resonant interconnect architecture in accordance with one aspect of the disclosure.

FIG. 7 illustrates a high-level view of the resonant interconnect architecture in accordance with one aspect of the disclosure. In the dual-rail implementation shown in this figure, a differential encoding scheme is used in which 1s are encoded as POS-high and NEG-low and 0s are encoded as POS-low and NEG-high. For each bit, a dual-rail resonant driver is used to transmit the data. All drivers use common and complementary resonant waveforms $\phi$ and $\bar{\phi}$ with frequency equal to the data rate f. The deployment of resonant drivers results in lower energy dissipation for charging and discharging the rails than the $CV^2$ required by conventional drivers.

Figure 8:
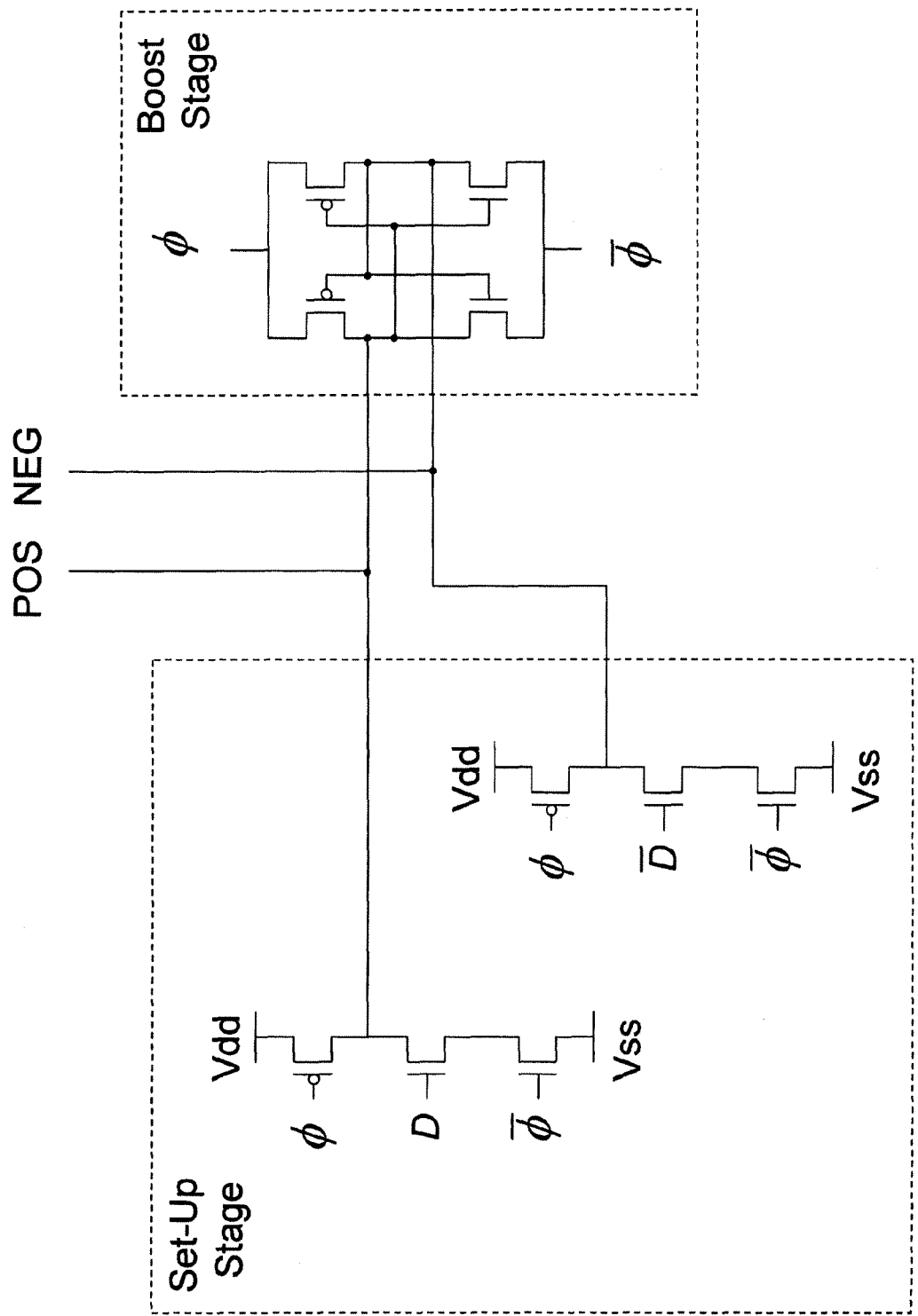
FIG. 8 shows a possible implementation of a dual-rail resonant driver as the boost driver.
Figure 9:
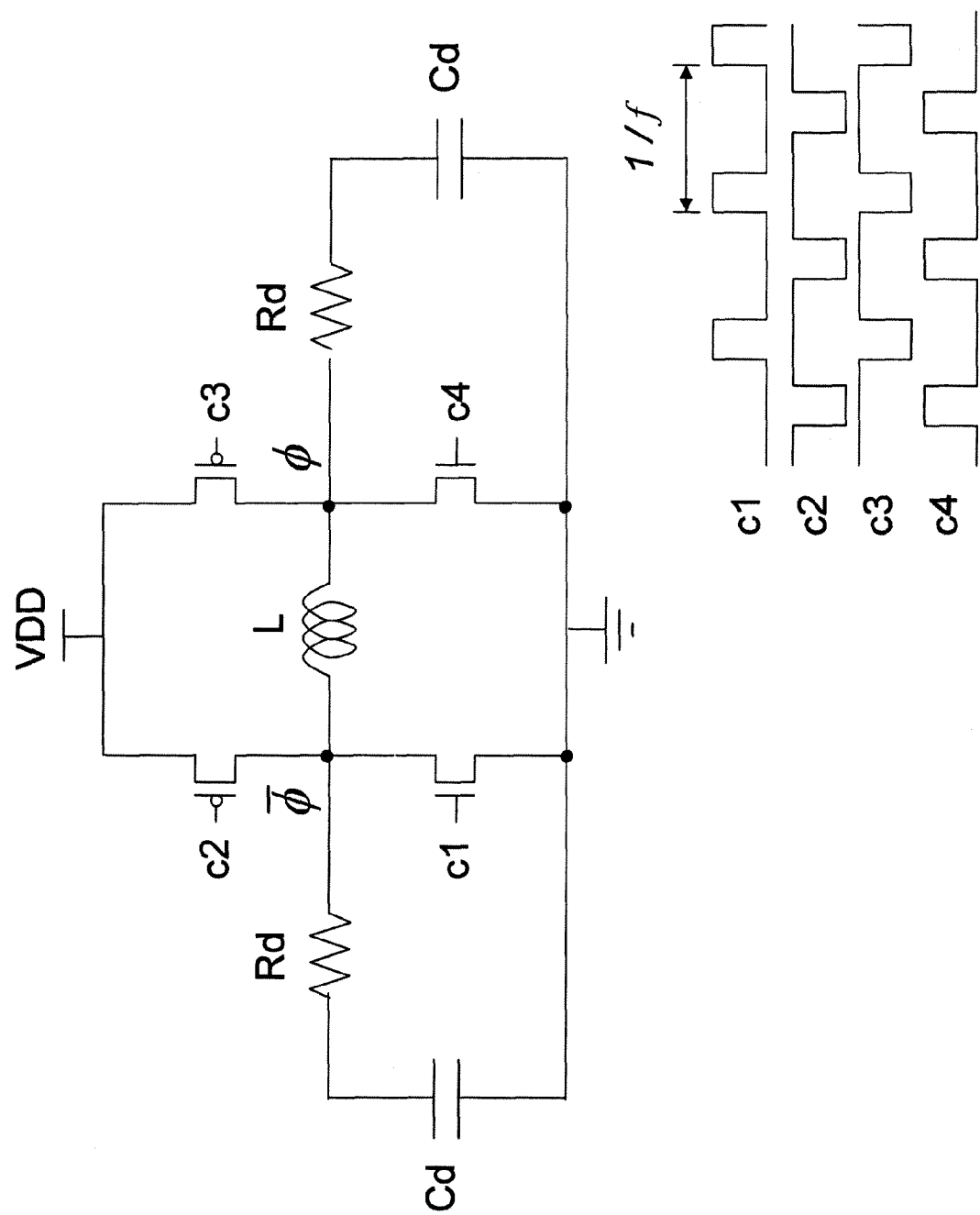
FIG. 9 shows a possible implementation of the circuitry that generates two complementary phases.
Figure 10A:
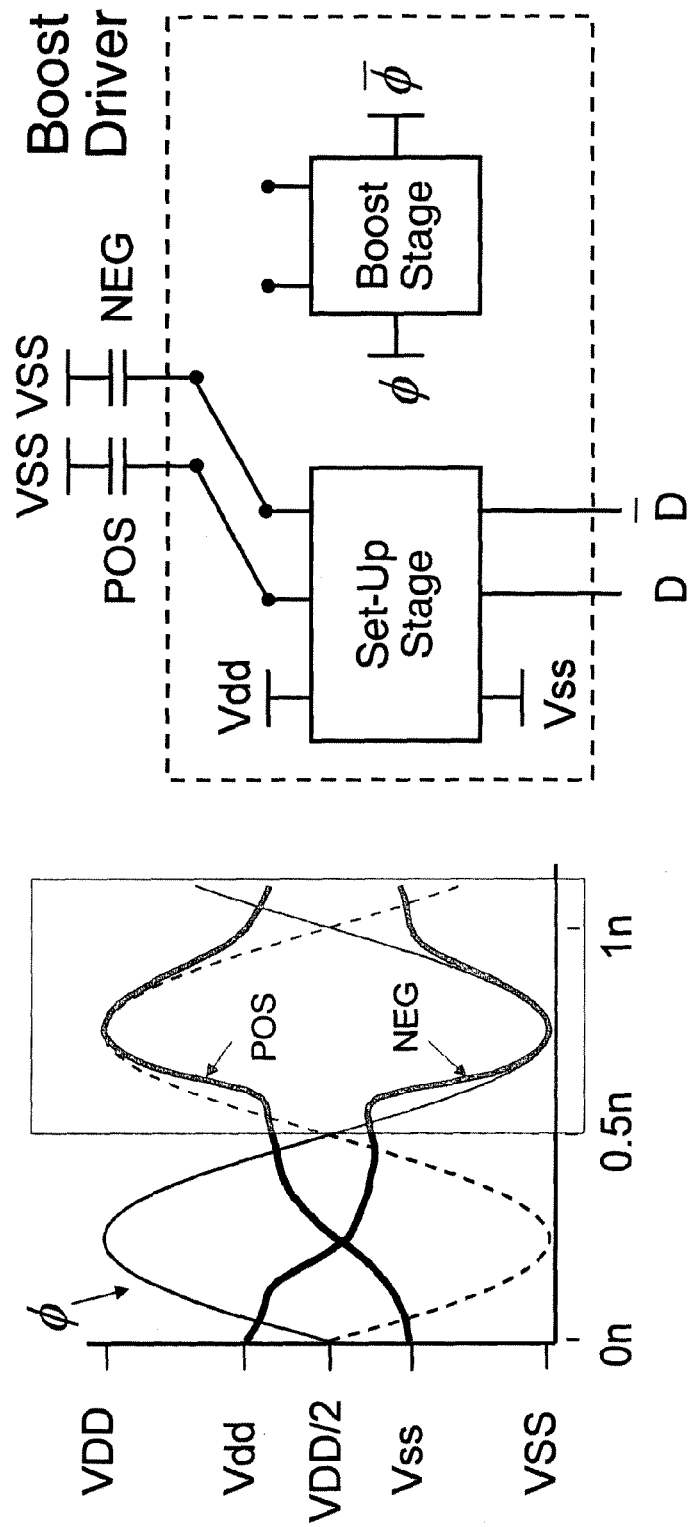
FIGS. 10(a)-(b) illustrate functioning of the boost driver in accordance with one aspect of the disclosure.
Figure 10B:
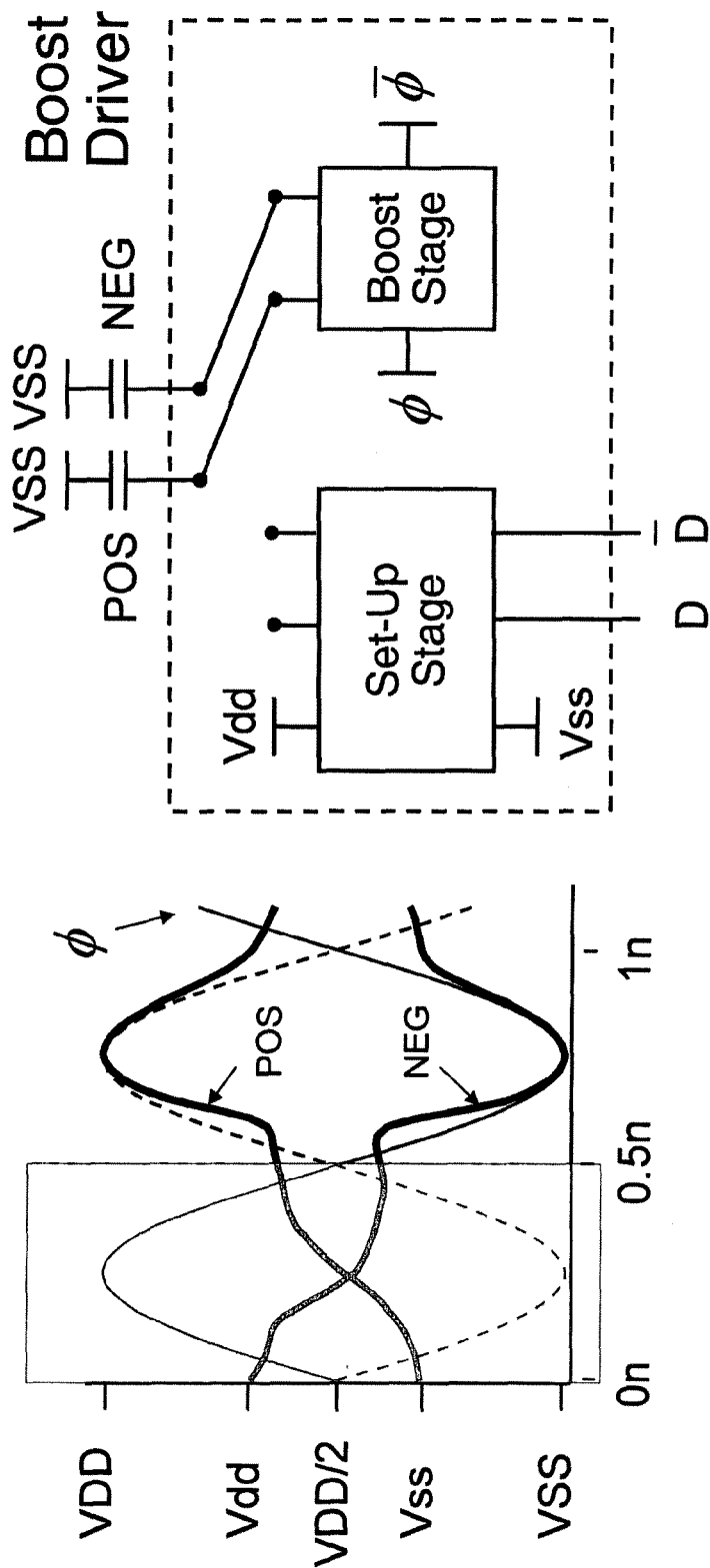

A possible implementation of a dual-rail resonant driver as the boost driver shown in FIG. 8. This boost driver incorporates aspects of the energy recovery boost logic described in the U.S. Pat. No. 7,355,454 ("Energy recovery boost logic"). It consists of a set-up stage with complementary data inputs D and $\bar{D}$ and supplies Vdd and Vss, and a boost stage. Both stages use two complementary resonant waveforms $\phi$ and $\bar{\phi}$. A possible implementation of the circuitry that generates these two complementary phases is shown in FIG. 9, where Rd and Cd are lump-model representations of the resistance and capacitance associated with the distribution of the waveforms $\phi$ and $\bar{\phi}$. In the set-up stage of the boost driver, the two evaluation trees with complementary data inputs D and $\bar{D}$ are used to set up an initial voltage difference between the two rails POS and NEG. The pair of cross-coupled inverters in the boost stage of the boost driver is used to first boost this initial voltage difference by driving it to VDD and to then restore it back to its initial value. FIG. 10 shows the signals at the POS and NEG rails that are generated by a boost driver during one cycle of the waveforms $\phi$ and $\bar{\phi}$. During the first half of the cycle, the set-up stage is driving the two rails, setting up an initial voltage difference between them, as shown in FIG. 10(a). In the second half of the cycle, the PMOS and NMOS devices that are driven by $\phi$ and $\bar{\phi}$ in the set-up stage decouple the rails POS and NEG from Vdd and Vss, allowing the boost-stage to drive these rails, first boosting their voltage difference to VDD and then restoring it back to its initial value, as shown in FIG. 10(b).

At the end of each bit-line in FIG. 7, a receiver is used to re-transmit or capture the data. To re-transmit data, the receiver is simply another boost driver. Boost drivers can be cascaded to form a high-speed low-power pipeline for transmitting data across large-scale interconnects. To capture data, a latching structure similar to a boost driver can be used. A possible implementation of such a latching structure is the flip-flop shown in FIG. 6.

In an alternative implementation of the resonant interconnect architecture, the dual-rail drivers are replaced by single-rail drivers that use a single resonant waveform $\phi$. In this case, straightforward amplitude-based encoding is used with a single rail per bit. In another alternative implementation, the resonant drivers operate in a "pulsed" mode, rather than in a steady-state oscillation, using a capacitive tank to store charge when not transmitting data. In this case, the waveform resulting on the bit-line is the transient response of the RLC network formed by the driver and the interconnect.

Figure 11:
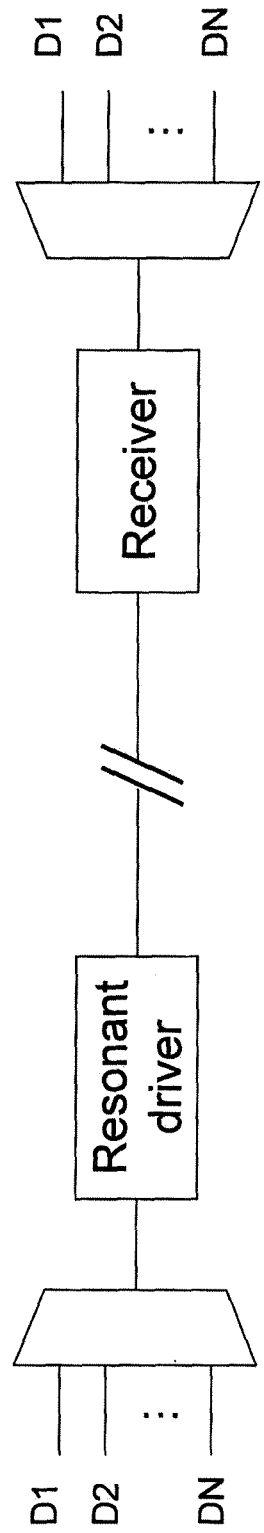
FIG. 11 illustrates multiplexing multiple bits over the same physical rail as illustrated in the disclosed resonant interconnect architecture.

In the disclosed resonant interconnect architecture, it is possible to significantly reduce interconnect overheads by multiplexing multiple bits, so that they are transmitted over the same physical rail, as illustrated in FIG. 11. The superior energy efficiency of the resonant interconnect enables the operation of the physical rail at a speed that is a multiple of the clock rate f. In this figure, the interconnect is driven N times faster than the clock rate f of the FPGA device, enabling the transmission of N bits over a single physical line at an effective data rate of f bits per second.

What is claimed is:

1. A system comprising:
    a semiconductor device comprising a set of configurable components, each of the set of configurable components comprising a first configuration and a second configuration;
    a clock generator configured to provide a resonant high-speed clock signal of frequency f to a first configurable component and a second configurable component of the set of configurable components; and
    a signal network configured to provide a set of enablement signals, at least one of the set of enablement signals being provided to the first configurable component to switch the first configurable component from the first configuration to the second configuration to provide a derived clock signal based on the resonant high-speed clock signal from the first configurable component at a frequency different from the frequency f and at least another of the set of enablement signals being provided to the second configurable component to switch the second configurable component from the first configuration to the second configuration to provide a derived clock signal based on the resonant high-speed clock signal from the second configurable component at a frequency different from frequency f.

2. The system of claim 1, wherein: the semiconductor device is one of: a microprocessor, an application-specific integrated circuit (ASIC), a system-on-a-chip (SOC), and a device with a high-performance and low-power clocking requirement.

3. The system of claim 1, wherein: the at least one of the set of enablement signals is provided to the first configurable component to provide the derived clock signal at an operating frequency that is a function of the frequency f of the resonant high-speed clock signal.

4. The system of claim 3, wherein: the operating frequency equals f divided by a fixed value j.

5. The system of claim 4, wherein: the resonant high-speed clock signal of frequency f is used in conjunction with the at least one of the set of enablement signals of frequency f divided by a fixed value j to provide the derived clock signal at a frequency f divided by j.

6. The system of claim 1, wherein: the at least one of the set of enablement signals is provided to the first configurable component to provide the derived clock signal at an operating frequency that is a function of frequency j of a given enablement signal of the set of enablement signals and the frequency f of the resonant high-speed clock signal.

7. The system of claim 6, wherein: the operating frequency equals f divided by j.

8. The system of claim 1, wherein: the at least one of the set of enablement signals and the another of the set of enablement signals are multiplexed to provide a third enablement signal to the first configurable component to provide the derived clock signal from the first configurable component at the frequency different from the frequency f.

9. The system of claim 8, wherein: the operating frequency equals f divided by a fixed value j.

10. A system, comprising:
    a programmable logic device (PLD) comprising a set of storage devices;
    a clock generator configured to provide a resonant high-speed clock signal of frequency f to a first storage device of the set of storage devices and to a second storage device of the set of storage devices; and
    a signal network configured to provide a set of enablement signals, each of the set of enablement signals being provided to at least one of the set of storage devices to configure the at least one of the set of storage devices to function based on the resonant high-speed clock signal at a frequency different from frequency f.

11. The system of claim 10, further comprising: multiple resonant clock distribution networks operable to provide a plurality of resonant high-speed clock signals of different frequencies to each of the set of storage devices in the programmable logic device.

12. The system of claim 10, wherein: the programmable logic device is a field programmable gate array (FPGA).

13. The system of claim 10, wherein: the resonant high-speed clock signal has very low jitter and skew.

14. The system of claim 10, wherein: one of the set of enablement signals is asserted to configure a subset of storage devices to each provide the derived clock signal based on the resonant high-speed clock signal at a frequency that is a fraction of f.

15. The system of claim 10, wherein: timing requirements on the set of enablement signals are loose.

16. The system of claim 10, wherein: the clock generator is operatively coupled with a resonant clock distribution network which has high intrinsic energy efficiency.

17. The system of claim 10, wherein: the clock generator is operatively coupled with a resonant clock distribution network which enables deep pipelining of data paths and data interconnect.

18. The system of claim 10, wherein: the signal network is a buffered network.

19. The system of claim 10, wherein: the clock generator is operatively coupled with a resonant clock distribution network which is operable to provide the resonant high-speed clock signal to the set of storage devices in the programmable logic device by distributing a global synchronization signal of frequency f to multiple resonant clock domains synchronized at frequency f.

20. The system of claim 19, wherein: each of the multiple resonant clock domains uses its own inductor and resonant clock driver.

21. The system of claim 20, wherein: at least one of the inductors is implemented on-chip.

22. The system of claim 20, wherein: at least one of the inductors is implemented off-chip in a package of the programmable logic device.

23. The system of claim 10, wherein the each of the set of storage devices is configured to provide the derived clock signal at an operating frequency that is a function of the frequency f of the resonant high-speed clock signal.

24. The system of claim 23, wherein the operating frequency of each of a subset of the set of storage devices equals f divided by a fixed value j.

25. The system of claim 24, wherein the resonant high-speed clock signal of frequency f is used by the at least one of the set of storage devices in conjunction with at least one of the set of enablement signals of frequency f divided by the fixed value j to provide the derived clock signal at a frequency f divided by j.

26. A system, comprising:
  means for providing a resonant high-speed clock signal of frequency f to each of a set of storage devices in a programmable logic device; and
  means for providing a plurality of enablement signals, wherein each of the plurality of enablement signals is provided to at least one of the set of storage devices to configure the at least one of the set of storage devices to function based on the resonant high-speed clock signal at a frequency different from the frequency f.

* * * * *